United States Patent [19]

Ziner et al.

[11] 4,401,331
[45] Aug. 30, 1983

[54] AUTOMOBILE DOOR GUARD

[76] Inventors: Edward H. Ziner, 5001 Windom Rd., Bladensburg; Adam A. Moroski, 6422 Kilmer St., Cheverly, both of Md. 20710

[21] Appl. No.: 204,332

[22] Filed: Nov. 5, 1980

[51] Int. Cl.³ .......................................... B60R 13/04
[52] U.S. Cl. .................................................. 293/128
[58] Field of Search ................. 293/128; 280/770; 403/108

[56] References Cited

U.S. PATENT DOCUMENTS 2,456,157 12/1948 Tadd .
2,540,773 11/1950 Settle, Jr. .
2,611,637 9/1952 Neslund .
2,675,983 4/1954 King .
2,889,165 6/1959 Zientara .
3,243,223 3/1966 Hoshell .
3,309,129 3/1967 Newman et al. .
3,367,702 2/1968 Sauer .
3,550,951 12/1970 Cobbs .
3,610,683 10/1971 Richter .
3,704,037 11/1972 Glassberg .
3,882,574 5/1975 Martinez .
4,002,363 1/1977 James .
4,085,763 4/1978 Thomas .............................. 403/108

OTHER PUBLICATIONS

Door Guard, General Motors, Cadillac Division.

Primary Examiner—Robert R. Song
Attorney, Agent, or Firm—Irvin A. Lavine

[57] ABSTRACT

An automobile body guard for attachment to the side of an automobile to protect against damage from the doors of adjacent automobiles, as on a parking lot. The body guard comprises a main section of adjustable length to attach to a door of any size, and an extension section to protect the body rearwardly of the front door. The main section comprises telescopic, spring-urged tubes, and a locking structure to lock the tubes at a selected length.

16 Claims, 9 Drawing Figures

U.S. Patent   Aug. 30, 1983   Sheet 1 of 2   4,401,331
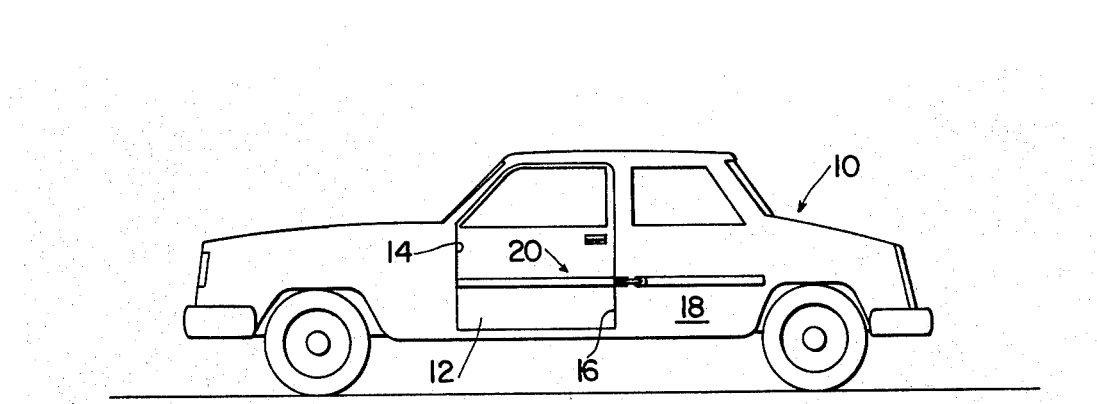
FIG. 1
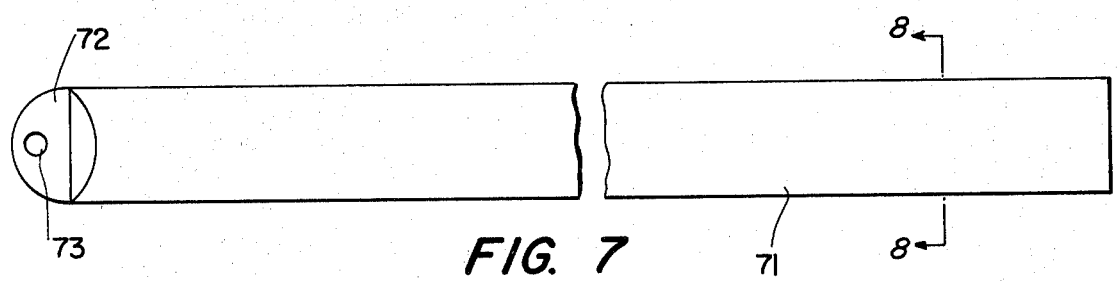
FIG. 7
FIG. 8
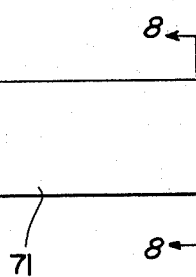
FIG. 9
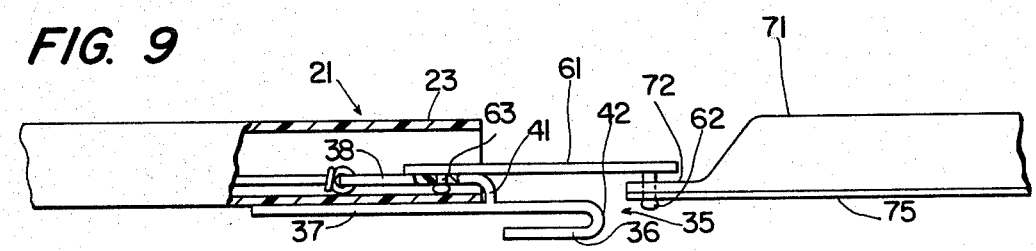

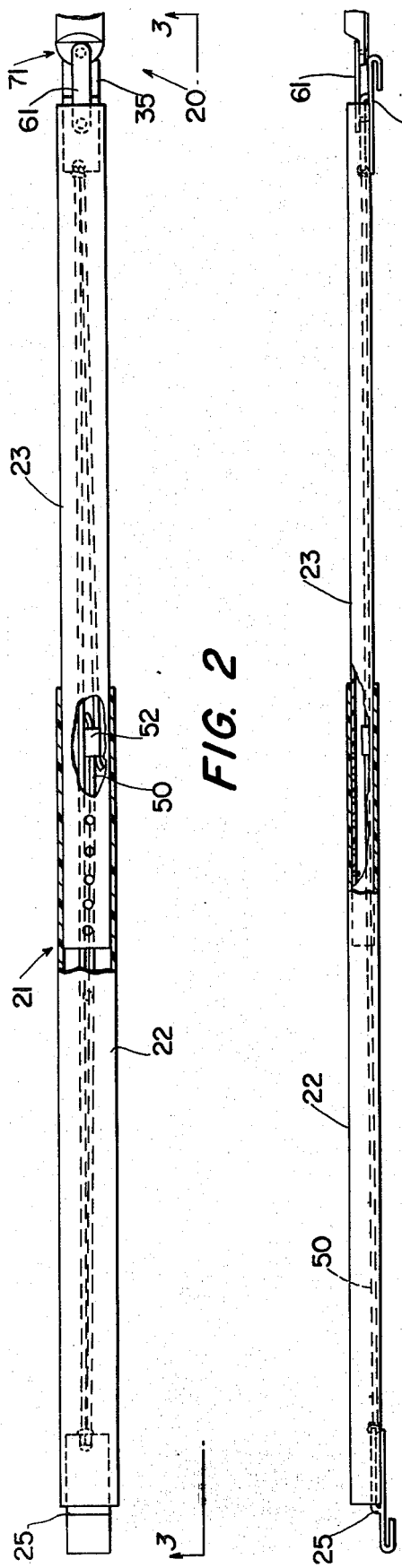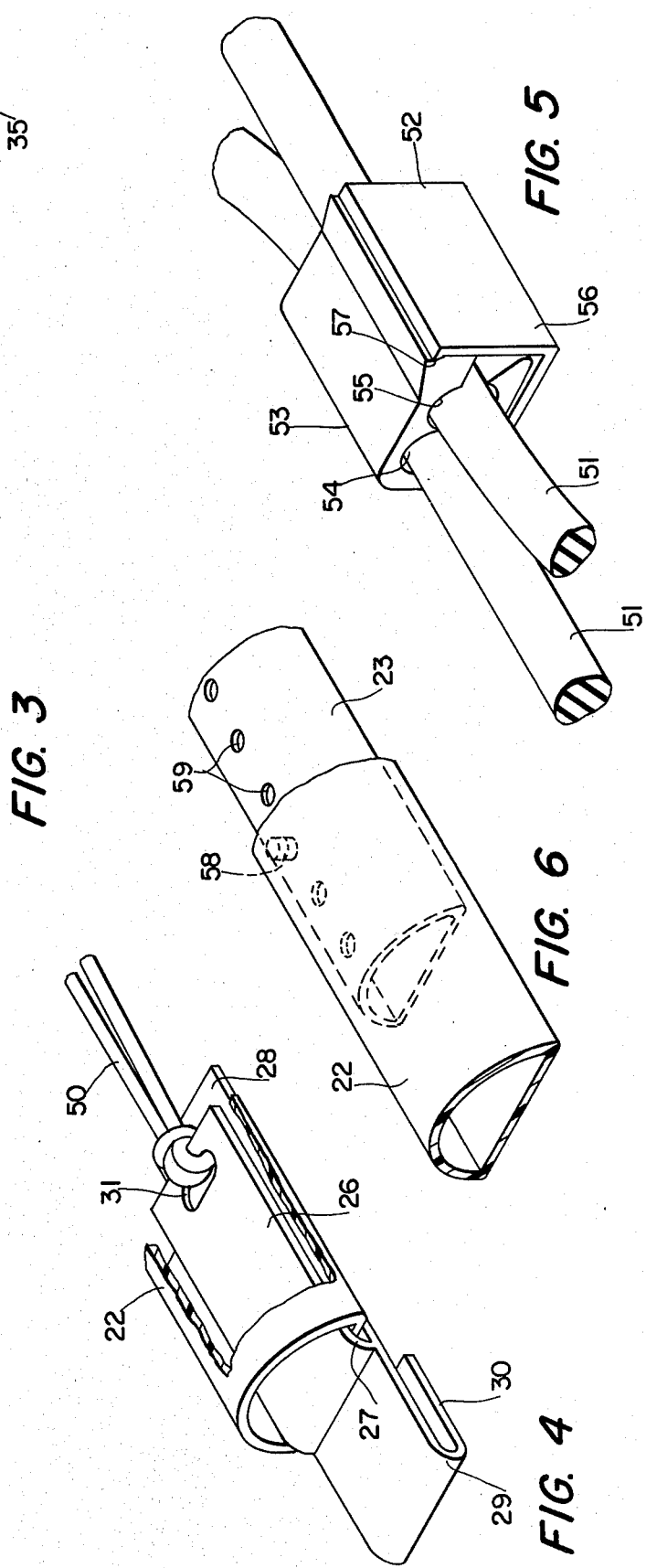

AUTOMOBILE DOOR GUARD

BACKGROUND OF THE INVENTION

The present invention relates to a guard to be applied to the door of an automobile so as to protect the door and adjacent areas of the body of the automobile from damage.

There has long been recognized the problem which is occasioned when automobiles are parked closely to each other, in parallel array, as on parking lots, the spacing between automobiles being so close that when the door of one automobile is opened, it strikes the adjacent automobile, along the sides of the body. This problem has resulted in a number of suggestions for guards to be attached to the doors and adjacent areas of the sides of the bodies of the automobiles, to be engaged by the opening door of the adjacent automobile, in order to provide a protection against damage, as by the denting of the body of the automobile, or the scratching of paint therefrom.

Hoshell U.S. Pat. No. 3,243,223 discloses a molding intended to be attached to an automobile door, and including telescopic tubes, with clips at their ends, to engage the edges of the car door. This guard is provided, internally, with a metal spring, for exerting a force on the clips, so as to maintain the door molding in position. Sauer U.S. Pat. No. 3,367,702 is of like effect, both patents disclosing complex mechanical structures. While these door moldings or door guards are satisfactory when applied, the springs are subject to deterioration with age, as may occur with rusting, and therefore may break. When this occurs, there is no longer present a tension force applied to the clips, holding the door guards onto the door, and as a result, the door guards will fall off. Further, these door guards protect only the door to which they are attached, and do not protect the entire length of the automobile body side which is subject to damage. These structures are also subject to being detached as by wind forces or the striking of them in a manner to cause them to elongate.

Zientara U.S. Pat. No. 2,889,165 provides a non-adjustable door guard having spring-urged clips for engaging the edges of the car door, and is therefore subject to some of the same deficiencies as noted above.

Martinez U.S. Pat. No. 3,882,574 also discloses a non-adjustable door guard, comprising a tube of plastic material, and end clips inserted into the tubes. Due to the lack of adjustability, this door guard would require custom manufacture for each width door, of which there are many in existence.

James U.S. Pat. No. 4,002,363 and Newman Et Al U.S. Pat. No. 3,309,129 disclose linear or rod-like door guards intended to protect more than just the door portion of an automobile body side; the former patent construction comprises a number of sections which are connected together, the entire door guard being attached to the edges of the wheel wells of the automobile, and thus must be removed prior to entry into the automobile, while the latter patent construction simply comprises a plurality of magnetically attached bars, independent of each other, thereby requiring that each be handled separately, and detached from the automobile to provide access to the interior. While such disclosures provide for protection of substantially the entire length of the body side of the automobile which is subject to damage from the opening of the doors of adjacent automobiles, due to their construction requiring removal to gain access, they are not facile.

Glassberg U.S. Pat. No. 3,704,037 and Richter U.S. Pat. No. 3,610,684 are examples of panels which are supported on automobiles, as from the door handle or door lock, and which extend forwardly and rearwardly from the read edge of the front door of the automobile, to provide protection for a limited length of the automobile body side.

Yet another proposal of the prior art is found in Neslund U.S. Pat. No. 2,611,637, in which the body guard is made of two telescopic tubes having integral end clip portions, and a nut and screw arrangement for causing telescopic collapsing of the tubes in order to provide the necessary tension on the telescopic tubes, so that the door guard would remain in place; this suggestion provided no possibility of guarding any portion of the body beyond the door, was deficient in that it required a screw driver to be used adjacent the exterior of the door, with resulting possibility of scraping of the paint by the screw driver, and also is deficient because the screw is subject to loosening with resulting decrease in tension and loss of the door guard from the automobile door.

SUMMARY OF THE INVENTION

The present invention provides an automobile body guard for attachment to the door of an automobile, being made of telescopic parts provided with end clips and a resilient element, and provided, further, with a locking structure to lock the body guard to an automobile door of substantially any length. The locking structure may comprise, for example, one or more projections on one of the telescopic parts, and one or more projection-receiving openings on the other of the telescopic parts. Such a construction has the advantage that, should the resilient element forming a part of the automobile body guard break or lose its tension, the automobile body guard will not come loose from the automobile door, but will remain in position on the automobile door. Also, the guard will not be lengthened by wind forces or striking of it. Further, the automobile body guard includes a linearly extending guard section, and a linearly extending extension guard section connected to it, in end-to-end relationship, preferably by an interconnecting member providing for pivotal movement of one section relative to the other, thereby providing for protection of the automobile body along substantially the entire length of the automobile body side which is subject to damage of the type hereinabove noted. The first or main section is attached to the automobile door, as by clips, and is adjustable, and the extension door section is provided with magnets, or the like, so that it may be detachably connected to the automobile body side rearwardly of the rear edge of the automobile door to which the first or main section is attached. This construction has the advantage that the main section is mounted with relative permanency on the automobile door, but the extension section may be readily detached from the automobile body, while remaining connected to the first or main section.

Accordingly, among the objects of the present invention are to provide an automobile body guard which is of adjustable length, which may be therefore utilized with automobile doors of different sizes, and which, further, provides for security of the door guard even if a resilient element of the door guard, urging it in position, should break or lose its tension. A further object of the present invention is to provide an automobile body guard of adjustable length which is secure against being detached by being elongated, as by wind forces or by being struck in a manner so as to cause it to be moved to a greater length. Another object of the present invention is to provide an automobile door guard including a first or main section provided with clips for permanently connecting it to an automobile door, and including, further, an extension section which is readily removable from attachment to the automobile body side, but which remains connected with the main section.

Other objects and many of the attendant advantages of the present invention will be readily understood from the following specification, claims and drawing.

BRIEF DESCRIPTION OF THE DRAWING

FIG. 1 is an elevational view of an automobile having the automobile body guard of the present invention attached thereto.

FIG. 2 is an elevational view, with parts removed, of the automobile body guard shown in FIG. 1.

FIG. 3 is a view, with parts removed and in section, taken on the line 3—3 of FIG. 2.

FIG. 4 is a perspective view, partly in section, of an end portion of the automobile body guard shown in FIGS. 2 and 3.

FIG. 5 is an enlarged perspective view of a portion of the automobile body guard shown in FIGS. 2 and 3.

FIG. 6 is an enlarged perspective view showing the locking arrangement of the main or first section of the automobile body guard of FIGS. 2 and 3.

FIG. 7 is an elevational view, with parts removed, of the extension guard section forming a part of the automobile body guard of FIG. 1.

FIG. 8 is a cross-sectional view taken on the line 8—8 of FIG. 7.

FIG. 9 is an enlarged view of the right hand end portion of the automobile body guard structure shown in FIG. 3.

DESCRIPTION OF THE PREFERRED EMBODIMENT

Referring now to the drawings, wherein like or corresponding reference numerals are used to designate like or corresponding parts throughout the several views, there is shown in FIG. 1 an automobile 10 of conventional construction, and including a front door 12 having front edge 14 and rear edge 16. Rearwardly of front door 12 there is a panel 18 forming a part of the automobile body side, although it will be understood that in a four-door automobile, there is provided a second door rearwardly of the door 12.

An automobile body guard 20 in accordance with the present invention is shown in position on the door 12, and extending over the panel 18, it being understood, of course, that the automobile body guard 20 would extend over a rear door, if the automobile 10 was a four door automobile.

In FIG. 2, there is shown the automobile door guard 20, there being a first linearly extending guard section 21 and a linearly extending extension guard section 71, the extension guard section 71 being connected to the guard section 21 in end-to-end relationship by a connector 61.

The linearly extending guard section 21 includes a first outer part 22 and a second inner part 23 telescopically received in it. The sections 22 and 23 are preferably made of a suitable plastic material, and in transverse cross-section have the shape of a D.

A clip 25 is provided at the left or outer end of the outer part 22, as shown in FIGS. 2 and 3, the clip 25 being shown in enlarged view in FIG. 4. Clip 25 has a stem portion 26, a cross portion 27 extending transversely thereof, and a portion 28 transverse of the cross portion 27, and in parallel spaced relation to the stem portion 26. Further, a second portion 29 extends from the end of portion 28 and coplanar therewith and has a return portion 30 parallel to said stem 26 and portion 28. At its inner end, the clip 25 has an opening 31, in portion 26.

A clip 35 is provided at the right end of the guard section 21, as shown in FIGS. 2 and 3. As best shown in FIG. 9, the clip 35 has a first portion 36 which extends in generally parallel, spaced relationship to the inner part 23 of guard section 21, and has a second portion 37 parallel to it, which is, like the first portion 36, on the outside of the part 23. A third portion 38 extends into the part 23, and is substantially parallel to the portions 36 and 37, the portion 38 having an opening in the inner end thereof, similar to the opening 31 shown in FIG. 4. A first transverse portion 41 connects the second portion 37 to the third portion 38 of clip 35, and a second transverse portion 42 connects the portions 36 and 37, and engages the door edge to retain the door guard in position on the door.

A resilient strand 50 is provided as a part of the automobile door guard 20, being within the telescopic parts 22 and 23, passing through the opening 31 in the clip 25, and the corresponding opening in the clip 35. The resilient strand 50 may have the ends thereof tied together. More conveniently, there may be provided a clamp 52 (see FIG. 5) of known construction, including a body portion 53 with passages 54 and 55 therein, for the runs of the strand 51, clamp 52 also having a clamp element 56 which is movable about a longitudinally extending axis (not shown), and movable from an open position to the closed position shown in FIG. 5, where a latch lip 57 engages and locks to the body 53, the clamp 52 thereby holding the runs of the resilient strand 51 in clamped position. The resilient strand 51 being attached to the end clips 25 and 35 and having the end clips engaging the outer ends of the parts 22 and 23, thereby provides a resilient urging of the parts 22 and 23 into collapsed, telescopic relationship with each other.

To provide for a locking together of the parts 22 and 23 of extension guard section 21, there is provided a locking structure which is best shown in FIG. 6. The locking structure includes a detent 58 extending inwardly from the outer part 22, and a plurality of openings in inner part 23, sized to receive the detent 58. A suitable number of the openings 59 may be provided, and while there has been shown only a single detent 58, it will be understood that additional detents may be provided, if desired. Further, the detents and openings may be positioned at other places on the parts 22 and 23, although the placement shown in FIG. 6 is preferred, since this will most readily permit engagement of the detent with the opening or openings.

In FIG. 7 there is shown the extension guard section 71, section 71 having a tab element 72 on one end thereof, with an opening 73 therethrough. The cross-sectional shape of the section 71 is shown in FIG. 8, and is of hollow D transverse cross section; that cross section is also the cross section of the parts 22 and 23 of the guard section 21. A magnet 75 is provided, extending linearly along the extension guard section 71, magnet 75 being attached to guard section 71, and being covered with a plastic layer, to avoid scratching the surface of an automobile. Both the extension guard section 71 and the magnet 75 are flexible, so that they may be bent, as a unit, to conform to a non-planer portion of the automobile 10, particularly the panel 18 thereof.

Referring again to FIG. 9, there is shown the extension guard section 71 with the magnet 75 thereon, and the tab 72 extending from the end thereof. A connector 61 is provided, in the form of a link having a detent 62 at one end extending through the opening 73 in tab 72. At the end of link 61 opposite tab 62 there is provided a second detent 63 which extends through an opening in the portion 38 of clip 35. The extension guard section 71 thereby not only extends rearwardly of the rear edge 16 of the door 12, to protect additional portions of the automobile body side, but, in addition, the link 61 serves as a connector to connect the extension guard section 71 to the first or main guard section 21. Since the extension guard section 71 is provided with a magnet 75, it may be magnetically secured to the automobile body side, being readily detached therefrom to provide entry into the automobile, while remaining attached to the automobile body guard section 21, which is permanently attached to the door 12 of the automobile.

There has been provided an automobile body guard comprising a telescopic guard section having clips and a resilient strand, to provide for adjustment of the length of the guard section, together with both resilient holding and detent locking security. A locking arrangement is provided to lock the guard section into any one of a number of desired lengths.

Further, there has been provided an automobile body guard comprising a first or main guard section of adjustable length, with provision for permanent, but detachable, attachment to an automobile door, and having connected to it, in end-to-end relationship, an extension guard section including a magnet or similar attaching means for extending along the automobile body side rearwardly of the door to which the first or main section is connected, and for releasable attachment thereto to thereby protect the automobile body side rearwardly of the noted door, while permitting relatively easy access into the interior of the automobile.

It will be obvious to those skilled in the art that various changes may be made without departing from the spirit of the invention, and therefore the invention is not limited to what is shown in the drawings and described in the specification but only as indicated in the appended claims.

We claim:

1. An automobile door guard comprising:
   (a) a linearly extending guard section having a first outer hollow part and a second inner part in telescopic engagement therewithin
   (b) a clip on each said part, each clip including a first portion extending in spaced relation to said part, a second portion extending into said part parallel to said first portion, and connecting means extending transversely between said first and second portions,
   (c) resilient means for urging said parts together connected to said second portion, and
   (d) means for locking said parts in any one of a plurality of positions.

2. The automobile body guard of claim 1, said locking means comprising a detent on one said part and a plurality of openings for receiving said detent extending along the other said part.

3. The automobile body guard of claim 2, said detent extending from an inner side of the outer telescopic part and said openings in said inner part extending therealong.

4. The automobile body guard of claim 1, said resilient means comprising a continuous elastic strand.

5. The automobile body guard of claim 4, and clamp means for anchoring parts of said strand together.

6. The automobile body guard of claim 1, each said clip further comprising an additional portion extending on the outer side of said section generally parallel to and inwardly of said spaced portion of said clip.

7. The automobile body guard of claim 1, and a linearly extending extension guard section, and means connecting said guard section and said extension guard section in substantially linear relationship.

8. The automobile body guard of claim 7, said connecting means being pivotally connecting means.

9. The automobile body guard of claim 7 or 8, said extension guard section comprising magnet means for attachment to an automobile body.

10. The automobile body guard of claim 1, said connecting means extending to one end of said first mentioned portion, an additional portion extending from said end of said first mentioned portion and coplanar therewith, and a return portion connected to said additional portion and parallel thereto.

11. An automobile body guard comprising:
    (a) a linearly extending guard section having clip means thereon for engaging the edges of an automobile door for attaching said guard section thereto,
    (b) a linearly extending extension guard section having means for attachment to an automobile body surface, and
    (c) means for connecting an end of said guard section to an end of said extension guard section.

12. The automobile body guard of claim 11, said connecting means comprising means for pivotally connecting said sections.

13. The automobile body guard of claim 11, said connecting means comprising a link pivotally connected to each said section.

14. The automobile body guard of claim 11, said guard section comprising a clip on an end thereof, and link means pivotally connected to said clip and to said extension guard section.

15. The automobile body guard of claim 11, said guard section comprising telescopic parts.

16. The automobile body guard of claim 11 or 15, said attachment means of said extension guard section comprising magnet means.

* * * * *